(12) United States Patent
Ito (10) Patent No.: US 11,615,224 B2
(45) Date of Patent: Mar. 28, 2023

(54) MODEL GENERATION METHOD

(71) Applicant: TOYOTA JIDOSHA KABUSHIKI KAISHA, Aichi-ken (JP)

(72) Inventor: Satoshi Ito, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 190 days.

(21) Appl. No.: 17/098,460

(22) Filed: Nov. 16, 2020

(65) Prior Publication Data
US 2021/0264074 A1 Aug. 26, 2021

(30) Foreign Application Priority Data

Feb. 20, 2020 (JP) .............................. JP2020-027353

(51) Int. Cl.
*G06F 30/20* (2020.01)
*G06F 30/27* (2020.01)
*G06F 111/10* (2020.01)
*G06F 30/23* (2020.01)

(52) U.S. Cl.
CPC .............. *G06F 30/20* (2020.01); *G06F 30/23* (2020.01); *G06F 30/27* (2020.01); *G06F 2111/10* (2020.01)

(58) Field of Classification Search
CPC .......... G06F 30/20; G06F 30/23; G06F 30/27; G06F 2111/10
See application file for complete search history.

(56) References Cited

U.S. PATENT DOCUMENTS

2019/0285610 A1 9/2019 Phan

FOREIGN PATENT DOCUMENTS

| JP | 2010286377 A | 12/2010 |
|---|---|---|
| JP | 5365356 B2 | 12/2013 |
| JP | 201410047 A | 1/2014 |
| JP | 6048358 B2 | 12/2016 |

(Continued)

OTHER PUBLICATIONS

Park SW. Analytical modeling of viscoelastic dampers for structural and vibration control. International Journal of Solids and structures. Nov. 1, 2001;38(44-45):8065-92. (Year: 2001).*

(Continued)

*Primary Examiner* — Chuen-Meei Gan
(74) *Attorney, Agent, or Firm* — Hauptman Ham, LLP (57) ABSTRACT

A static matrix model in a viscoelastic body is generated for each environmental temperature condition. A generalized Maxwell model is generated for each environmental temperature condition using a matrix of the static matrix model. A spring coefficient and a damper viscosity coefficient of a material test piece is identified as a function of a strain rate norm based on a measurement result of the material test piece using a temperature-time conversion rule. An average strain rate of a part is identified as a function of a displacement rate vector. A dynamic spring coefficient and a damper viscosity coefficient of the part are identified as a function of a component of the displacement rate vector. A generalized Maxwell model for analysis is generated by applying the dynamic spring coefficient and the damper viscosity coefficient identified as the function of the component of the displacement rate vector to the generalized Maxwell model.

3 Claims, 9 Drawing Sheets

(56) References Cited

FOREIGN PATENT DOCUMENTS

JP      6551320 B2    7/2019
JP      2019159897 A  9/2019

OTHER PUBLICATIONS

Bódai G, Goda T. A new, tensile test-based parameter identification method for large-strain generalized Maxwell-model. Acta Polytechnica Hungarica. Jan. 1, 2011;8(5):89-108. (Year: 2011).*

Ucar H, Basdogan I. Dynamic characterization and modeling of rubber shock absorbers: A comprehensive case study. Journal of Low Frequency Noise, Vibration and Active Control. Sep. 2018;37(3):509-18. (Year: 2018).*

* cited by examiner

MODEL GENERATION METHOD

CROSS-REFERENCE TO RELATED APPLICATION

This application claims priority to Japanese Patent Application No. 2020-027353 filed on Feb. 20, 2020, incorporated herein by reference in its entirety.

BACKGROUND

1. Technical Field

The disclosure relates to a model generation method for generating a model that reproduces a dynamic response of a part including a member made of a viscoelastic body.

2. Description of Related Art

Conventionally, a suspension bush and an engine mount have been used in a joint between a vehicle suspension and an engine and a vehicle body for the purpose of suppressing transmission of vibration. To understand a ride quality of a vehicle, it is important to accurately understand a dynamic response of the parts above. Therefore, conventionally, a model for reproducing the dynamic response of the parts has been generated.

Japanese Patent No. 5365356 (JP 5365356 B) discloses a modeling method of a bush (suspension bush) attached to the vehicle suspension (a method of obtaining a bush matrix model). The bush is a part configured by providing a viscoelastic body (for example, rubber) that is distorted in accordance with a load between an inner cylinder and an outer cylinder having cylindrical shapes that are substantially coaxial with each other, for example. With this configuration, shock absorption, etc. is possible between parts connected to the inner cylinder and the outer cylinder, respectively. In the bush matrix model, modeling is performed by associating a relative displacement between the inner cylinder and the outer cylinder of the bush (components in each direction of X, Y, and Z axes and components in a rotation direction around each axis), or in addition to this, a motion state vector d having velocity, which is a rate of change of the displacement over time, acceleration, and a power of at least second order, as components, with a vector (load vector) F having loads applied to the bush as components (components in each direction of the X, Y, and Z axes and six components of moments around the axes), using a coefficient matrix (hereinafter sometimes simply referred to as a matrix) H as in Equation 1 shown below.

$$F=Hd \qquad \text{Equation 1}$$

In addition, Japanese Patent No. 6551320 (JP 6551320 B) discloses, based on the technology of described in JP 5365356 B above, a model generation method to model a deformation history dependence of the viscoelastic body by combining the technology in JP 5365356 B with a generalized Maxwell model such that reproducibility of the dynamic response is realized.

SUMMARY

Characteristics (dynamic response) of a member that is made of a viscoelastic body may change in accordance with an environment temperature when a load is input to the member.

However, the model generation method disclosed in each of the patent documents above does not consider that the characteristics of the member change in accordance with a temperature environment. Therefore, a model taking into account a dependence on a temperature environment cannot be generated.

The inventors of the disclosure focused on that the characteristics of the member change in accordance with the environmental temperature when the load is input to the member, and considered a model generation method that reflects the change in the characteristics.

The disclosure has been made in view of the above points, and an object of the disclosure is to provide a model generation method that is capable of generating a model corresponding to the environmental temperature as a model that reproduces a dynamic response of a part including a member made of a viscoelastic body.

Means for solving an issue of the disclosure for achieving the above object is premised on a model generation method for generating a dynamic model that is a model for reproducing a dynamic response of a part including a member made of a viscoelastic body. The model generation method is characterized by including: a step of generating a static model in the viscoelastic body for each of environmental temperature conditions; a step of generating a generalized Maxwell model for each of the environmental temperature conditions using the static model; a step of identifying a spring coefficient and a damper viscosity coefficient of the viscoelastic body as a function of a strain rate norm based on a measurement result of a material test piece using a temperature-time conversion rule; a step of identifying an average strain rate of the part as a function of a displacement rate vector; a step of identifying a dynamic spring coefficient and the damper viscosity coefficient of the part as a function of a component of the displacement rate vector; and a step of generating a generalized Maxwell model for analysis by applying the dynamic spring coefficient and the damper viscosity coefficient identified as the function of the component of the displacement rate vector to the generalized Maxwell model.

With this specific item, a model (generalized Maxwell model for analysis) in accordance with the environmental temperature can be generated as a model for reproducing the dynamic response of the part including the member made of a viscoelastic body. Consequently, highly accurate analysis of the dynamic response that reflects the characteristics changing in accordance with the temperature environment can be performed.

Further, in the step of generating the static model, a relationship between a stress and a strain for each of the environmental temperature conditions is obtained, with a use of the material test piece made of the viscoelastic body, by inputting a load to the material test piece while changing the environmental temperature conditions so as to generate the static model using data of the relationship between the stress and the strain for each of the environmental temperature conditions.

According to the above, the static model can be generated based on the data of a test using the actual viscoelastic body. Therefore, highly accurate analysis of the dynamic response in accordance with each environment temperature can be performed as the generalized Maxwell model for analysis.

Further, the static model in the viscoelastic body that is generated for each of the environmental temperature conditions is a static matrix model, and in the step of generating the generalized Maxwell model, the generalized Maxwell model is generated for each of the environmental temperature conditions using a matrix of the static matrix model.

According to this, the generalized Maxwell model for analysis that can accurately reproduce the direction coupling in addition to the temperature dependence can be generated.

In the disclosure, the generalized Maxwell model is generated using the static model in a viscoelastic body that is generated for each environmental temperature condition, and the generalized Maxwell model for analysis is generated by applying the dynamic spring coefficient and the damper viscosity coefficient that are identified as the function of the component of the displacement rate vector to the generalized Maxwell model thus generated. Therefore, the generalized Maxwell model for analysis corresponding to the environment temperature can be generated as a model that reproduces the dynamic response of the part including the member made of a viscoelastic body, and further, highly accurate analysis of the dynamic response that reflects the characteristics changing in accordance with the temperature environment can be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a plurality of embodiments of the disclosure will be described with reference to the drawings. In each of the following embodiments, a case where a model generation method of the disclosure is applied to a modeling method of a bush (suspension bush) attached to a vehicle suspension will be described.

The model generation method in the following embodiments, as an outline, generates a simulation model capable of responding to a change in a temperature environment taking into account a dependence of a viscoelastic body on the temperature environment in comparison with the model generation method disclosed in JP 6551320 B. Specifically, the model generation method in the following embodiments includes a step of generating a static bush matrix model (static model according to the disclosure) for each of various temperature conditions and generating a generalized Maxwell model using a matrix of the generated static bush matrix model.

Before describing each of the embodiments, the basics of the generalized Maxwell model and the bush matrix model as the viscoelastic material constitutive equation will be described.

Generalized Maxwell Model

Figure 1:
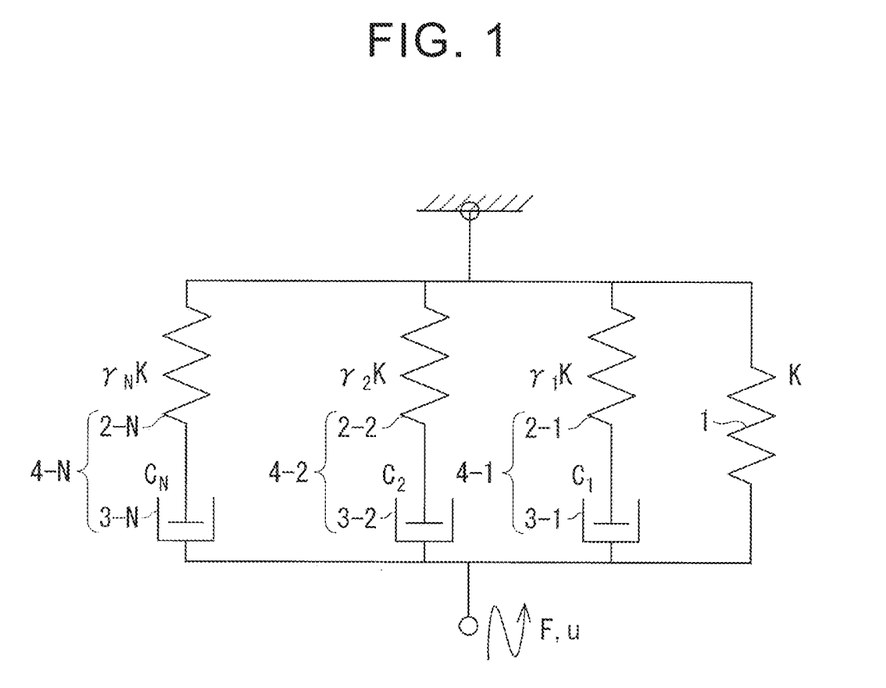
FIG. 1 is a diagram showing an example of a generalized Maxwell model.

FIG. 1 is a diagram showing an example of the generalized Maxwell model.

As shown in FIG. 1, the generalized Maxwell model is a model including a static spring 1 having a spring constant K, and a dynamic spring 4-$i$ ($i=1, \ldots, N$) in which a spring 2-$i$ having a spring constant $\gamma_i K$ ($\gamma_i$ is a dynamic spring coefficient) and a damper 3-$i$ having a damper viscosity coefficient $C_i$ are connected in series. In this model, the viscoelastic body is modeled by connecting the dynamic springs 4-1, ..., 4-N in parallel to the static spring 1 modeling the elastic body. The number N of dynamic springs is appropriately set in accordance with, for example, characteristics of a target viscoelastic body and a required accuracy of the model.

Basics of Bush Matrix Model

The basics of the bush matrix model, which is a static model, will be described. Here, a displacement vector u represents a relative displacement of an inner cylinder with respect to an outer cylinder of the bush to be modeled, and is defined as a motion state vector. Each component value in the coefficient matrix H is calculated such that the bush matrix model, which is the static model, is generated. The coefficient matrix H associates the load vector F to be applied to the bush with the displacement vector u as shown in Equation (2) below. For example, the displacement vector u includes directional components $u_x$, $u_y$, $u_z$ of X, Y, and Z axes and rotational components $u_{rx}$, $u_{ry}$, $u_{rz}$ about the respective axes as the components as in Equation (3) below. Further, the load vector F includes the component $F_x$, $F_y$, $F_z$ in the respective directions of the X, Y, and Z axes and moments $M_x$, $M_y$, $M_z$ around the respective axes as the components as shown in Equation (4) below. An origin of each axis is, for example, the center of gravity of the bush. The coefficient matrix H is a matrix with 6 rows and 6 columns. The component values of the coefficient matrix H can be calculated using, for example, a conventionally known method.

Equation 2

$$F = Hu \tag{2}$$

-continued

Equation 3

$$u = \begin{pmatrix} u_x \\ u_y \\ u_z \\ u_{rx} \\ u_{ry} \\ u_{rz} \end{pmatrix} \quad (3)$$

Equation 4

$$F = \begin{pmatrix} F_x \\ F_y \\ F_z \\ M_x \\ M_y \\ M_z \end{pmatrix} \quad (4)$$

First Embodiment

Next, a first embodiment of the disclosure will be described.

Figure 2:
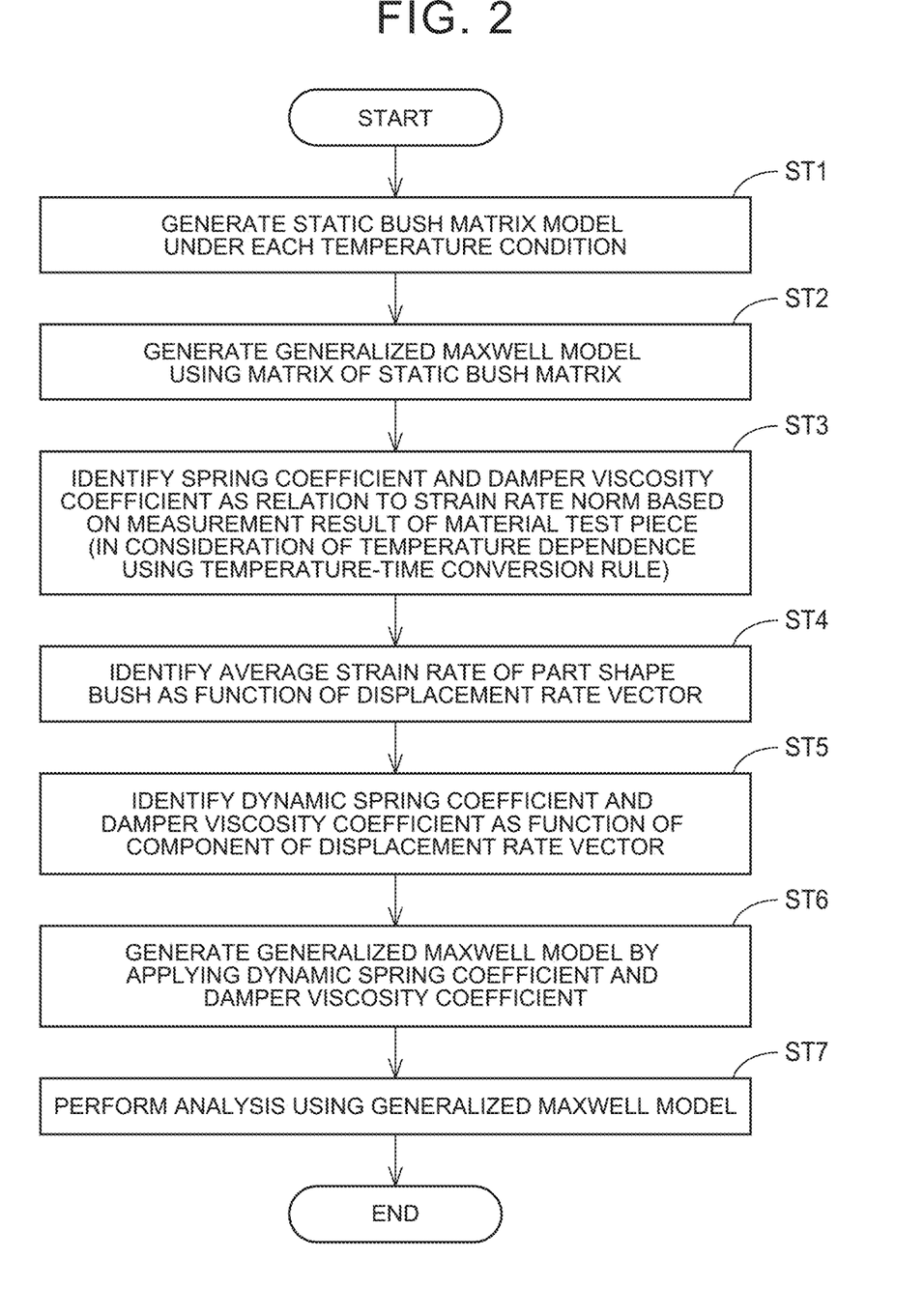
FIG. 2 is a flowchart showing a processing procedure of a model generation method according to an embodiment.

FIG. 2 is a flowchart showing a processing procedure of the model generation method according to the first embodiment. Hereinafter, the processing procedure for generating the generalized Maxwell model as a simulation model capable of responding to changes in the temperature environment will be described. The processing procedure consists of steps ST1 to ST7 shown below.

Step ST1

In step ST1, the bush matrix model (static bush matrix model) is generated for each temperature condition (environmental temperature condition).

Figure 3:
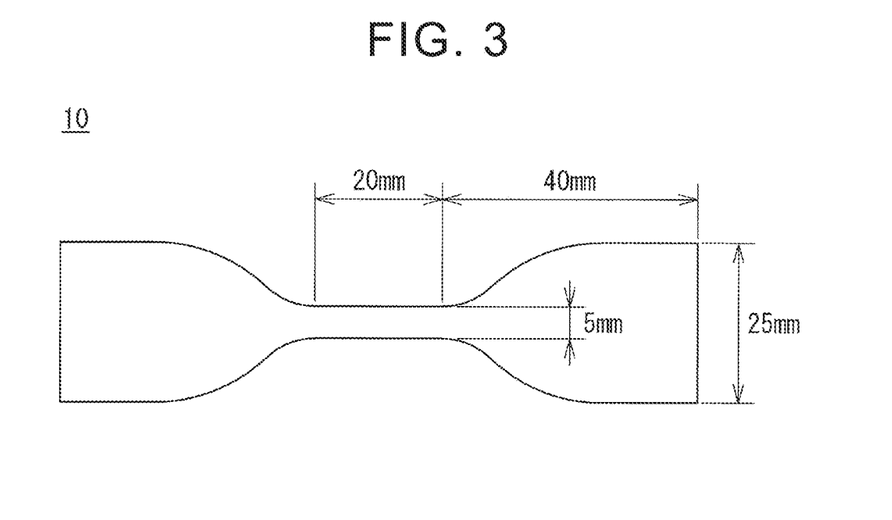
FIG. 3 is a diagram showing a material test piece.

FIG. 3 shows a material test piece (dumbbell test piece) 10 used in a material test when generating the static bush matrix model for each temperature condition. The material test piece 10 is made of the same material as a viscoelastic body (rubber member; hereinafter sometimes simply referred to as a member) used for an actual bush, but has a different size and shape from the member. As shown in FIG. 3, the material test piece 10 has a total length of about 100 mm and both ends have a constant diameter, while a middle portion has an elongated shape. The material test piece 10 is designed to have predetermined size and shape such that measurement tests such as a tensile test and a vibration test are easily conducted with both ends held.

Figure 4:
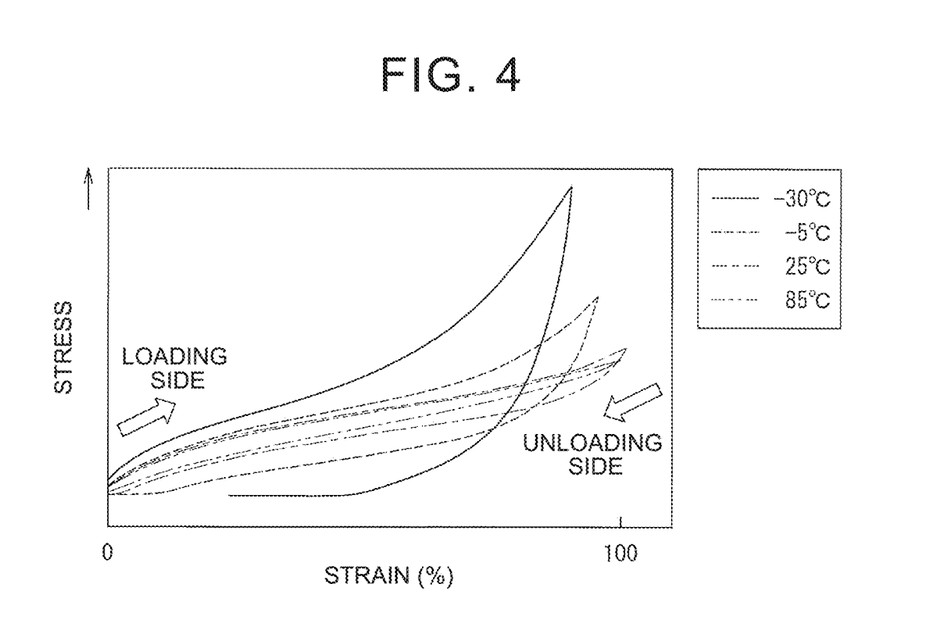
FIG. 4 is a diagram showing a stress-strain diagram for each environmental temperature, which is a result of a material test.

In the material test, a relationship between a stress and a strain for each temperature condition is obtained by inputting a load to the material test piece 10 while changing the environmental temperature condition. FIG. 4 is a stress-strain diagram showing a result of each material test when the environmental temperatures are −30° C., −5° C., 25° C., and 85° C. A solid line in FIG. 4 is the stress-strain diagram showing the case where the environmental temperature condition is −30° C., a broken line in FIG. 4 is the stress-strain diagram showing the case where the environmental temperature condition is −5° C., the long dashed short dashed line in FIG. 4 is the stress-strain diagram showing the case where the environmental temperature condition is 25° C., and a two-dot chain line in FIG. 4 is the stress-strain diagram showing the case where the environmental temperature condition is 85° C. Although the relationships between the stress and the strain are obtained under four types of temperature conditions, it is desirable to find the relationships between the stress and the strain under more temperature conditions.

As can be seen from FIG. 4, the relationships between the stress and the strain greatly differ from each other depending on the environmental temperature conditions. For example, a rate of change in the strain with respect to an amount of increase in the stress increases as the environmental temperature increases. The relationship between the stress and the strain has a hysteresis between when the load is increased (loading side) and when the load is decreased (unloading side). The hysteresis increases as the environmental temperature decreases. As described above, the characteristics of the member made of the viscoelastic body are significantly dependent on the environmental temperature when the load is input to the member.

In step ST1, data on the relationship between the stress and the strain for each temperature condition is stored in a database of a computer (not shown) that implements the model generation method according to the disclosure.

Then, after the material test is completed under all of the environmental temperature conditions, each data is read from the database, and material parameters $C_{i0}$, $D_i$ are calculated for each temperature using the Yeoh model equation of Equation (5) below (i=1, 2, 3). The Yeoh model equation is a strain energy density function that is generally used in the analysis of the viscoelastic body, and is known as an equation capable of being accurately approximated in a wide strain region.

Equation 5

$$U = C_{10}(\bar{I}_1 - 3) + C_{20}(\bar{I}_1 - 3)^2 + \quad (5)$$
$$C_{30}(\bar{I}_1 - 3)^3 + \frac{1}{D_1}(J^{el} - 1)^2 + \frac{1}{D_2}(J^{el} - 1)^4 + \frac{1}{D_3}(J^{el} - 1)^6$$

$U$: Strain energy potential $C_{i0}$, $D_i$: Material parameters $J^{el}$: Elastic volume ratio $\bar{I}_1$: First invariant of deviation strain A finite element method (FEM) model is then constructed using the material parameters $C_{i0}$, $D_i$ calculated from Equation (5), and the static bush matrix model is generated for each temperature condition by the procedure described below.

Figure 5:
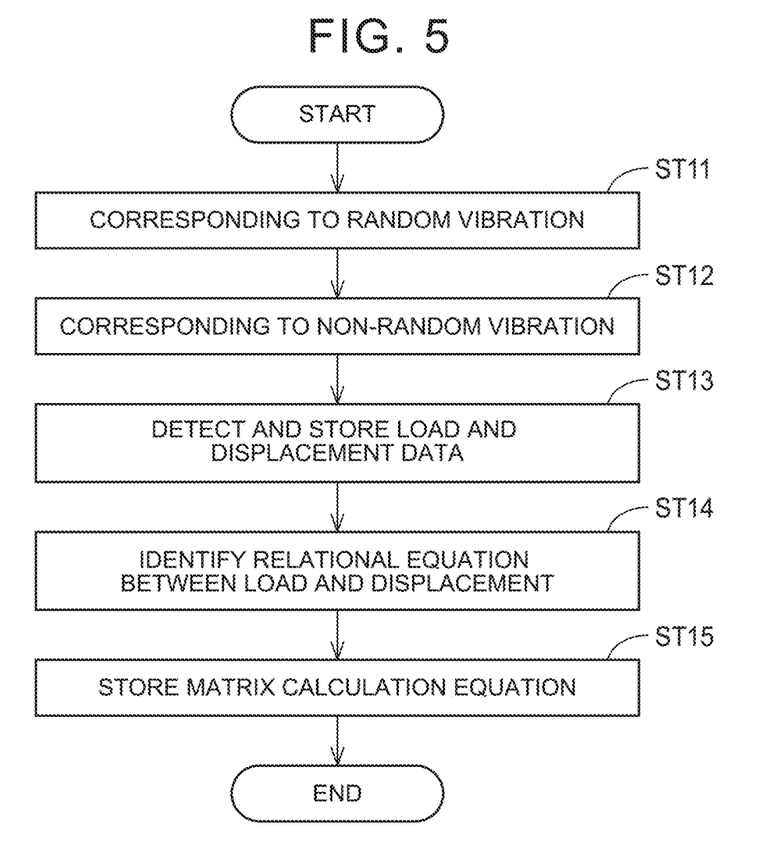
FIG. 5 is a flowchart showing a procedure for generating a static bush matrix model.

The static bush matrix model is generated by the procedure shown in FIG. 5. Hereinafter, the procedure (static bush matrix model generation method) will be briefly described.

First, random vibration is assumed to be performed on the FEM model (corresponding to random vibration, in step ST11). The random vibration corresponds to vibration in directions other than the six axes, which are the directions of the main axes (X axis, Y axis, Z axis) of the bush and the rotation direction of the main axes. Loads in the axial directions of X-axis, Y-axis, and Z-axis are referred to as $F_x$, $F_y$, and $F_z$, respectively.

Next, non-random vibration is assumed to be performed on the FEM model (corresponding to non-random vibration, in step ST12). The non-random vibration above corresponds to that the bush is vibrated so as to move in the axial directions of the X-axis, the Y-axis, and the Z-axis, and the bush is also vibrated so as to rotate around the respective axes.

Load data and displacement data of the bush when the random vibration and the non-random vibration are assumed to be performed are then stored (step ST13).

Next, the stored load data and displacement data are processed, a relational equation between the load data and displacement data is identified, and a bush simulation model (matrix calculation equation) is generated and stored (steps ST14, ST15). Specifically, the relationship between the load applied to the bush and a motion state on assumption that non-random vibration is performed is defined as Equation (6) below, and "relation matrix 1" in Equation (6) is identified using, for example, the least-squares method and a neural network.

Equation 6

$$(\text{Load}) = (\text{relation matrix 1})(\text{Motion state 1}) \quad (6)$$

Here, "load" on the left side of Equation (6) is the matrix of 6 rows and 1 column shown in Equation (4), and configured of the loads $F_x$, $F_y$, $F_z$ in the respective directions of the X-axis, the Y-axis, and the Z-axis of the bush and the moments $M_x$, $M_y$, $M_z$ of the respective axes.

"Relation matrix 1" on the right side of Equation (6) is, for example, a coefficient matrix of 6 rows and 18 columns (not shown), and is configured of 108 coefficients.

"Motion state 1" on the right side of Equation (6) is, for example, a matrix of 18 rows and 1 column (not shown), and is configured of parameters relating to the displacement (for the matrices herein, refer to JP 5365356 B).

After the load data and the displacement data on assumption that the bush is non-randomly vibrated are obtained, "relation matrix 1" in Equation (6) is identified using the least-squares method and the neural network.

Next, the load data on assumption that the bush is randomly vibrated is corrected. That is, the corrected load data is obtained by inputting the load data and the displacement data on the assumption that the bush is randomly vibrated to Equation (7) below.

Equation 7

$$\begin{pmatrix}\text{Corrected}\\\text{load}\end{pmatrix} = \begin{pmatrix}\text{Load}\\\text{measured}\\\text{with}\\\text{random}\\\text{vibration}\end{pmatrix} - \begin{pmatrix}\text{Relation}\\\text{matrix 2}\end{pmatrix}\begin{pmatrix}\text{Motion state}\\\text{measured}\\\text{with random}\\\text{vibration}\end{pmatrix} \quad (7)$$

Here, "relation matrix 2" on the right side of Equation (7) is, for example, a coefficient matrix of 6 rows and 18 columns (not shown).

"Motion state measured with random vibration" on the right side of Equation (7) is, for example, a matrix of 72 rows and 1 column (not shown), and is configured of parameters relating to the displacement (for the matrices herein, refer to JP 5365356 B).

Next, the relationship between the load and the motion state when random vibration is assumed is identified. That is, similar to Equation (6) described above, the relationship between the load and the motion state of the bush when random vibration is assumed is defined as in Equation (8) below so as to identify "relation matrix 2". The corrected load data obtained based on Equation (7) and the stored displacement data when random vibration is assumed are input to Equation (8), and "relation matrix 2" is identified by using, for example, the least-squares method and the neural network.

Equation 8

$$\begin{pmatrix}\text{Corrected}\\\text{load}\end{pmatrix} = \begin{pmatrix}\text{Relation}\\\text{matrix 2}\end{pmatrix}\begin{pmatrix}\text{Function of}\\\text{motion state}\\\text{measured with}\\\text{random}\\\text{vibration}\end{pmatrix} \quad (8)$$

When "relation matrix 1" and "relation matrix 2" are identified by performing the series of processing above, the bush simulation model is defined as in Equation (9) below. That is, the relational equation when the non-random vibration defined using "relation matrix 1" is assumed is added to the relational equation when the random vibration defined using "relation matrix 2" is assumed so as to derive the bush simulation model as shown in Equation (9). In Equation (9), the first term on the right side represents the main axis characteristic and a shape coupling component of the bush, and the second term represents a coupling compound characteristic due to a compound displacement. Here, the shape coupling component is a force generated in a direction that is different from a displacement direction. Further, the coupling component due to the compound displacement means that the load-displacement characteristics are changed by the compound displacement in which the axis is displaced while being twisted.

Equation 9

$$(\text{Load}) = \begin{pmatrix}\text{Relation}\\\text{matrix 1}\end{pmatrix}\begin{pmatrix}\text{Motion}\\\text{state 1}\end{pmatrix} + \begin{pmatrix}\text{Relation}\\\text{matrix 2}\end{pmatrix}\begin{pmatrix}\text{Function of}\\\text{motion state}\\\text{measured with}\\\text{random}\\\text{vibration}\end{pmatrix} \quad (9)$$

Step ST2

Figure 6:
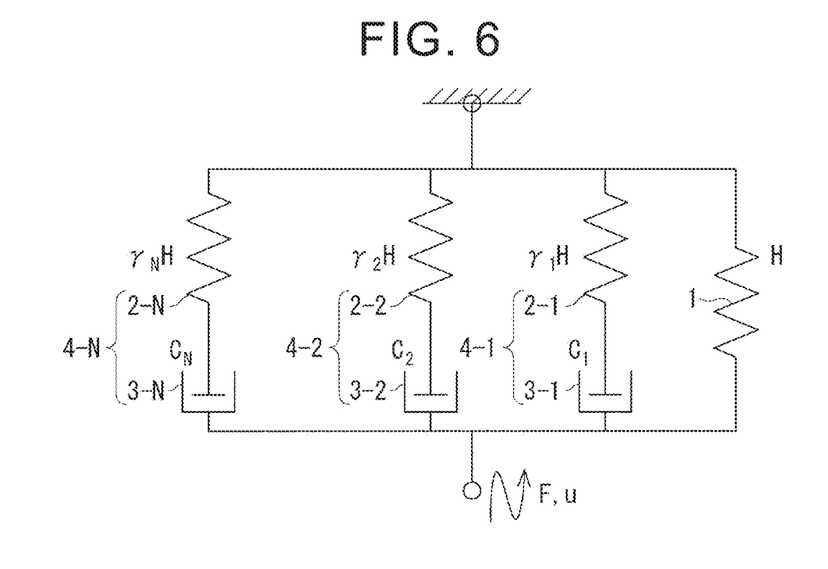
FIG. 6 is a diagram showing the generalized Maxwell model in the embodiment.

In step ST2, the generalized Maxwell model in which the matrix H in the bush matrix model generated in step ST1 is used as a spring coefficient matrix is generated. As shown in FIG. 6, an element configuration of springs and dampers of this model is considered as a configuration in which, in the generalized Maxwell model shown in FIG. 1, the spring coefficient is replaced from a scalar K to the matrix H, and a variable is replaced from the displacement (scalar) to the displacement vector u. The model is a model configured to include a static spring 1 having the spring constant (matrix) H, and the dynamic spring 4-$i$ ($i=1, \ldots, N$) in which the spring 2-$i$ having a spring constant $\gamma_i H$ ($\gamma_i$ is a dynamic spring coefficient) and the damper 3-$i$ having the damper viscosity coefficient $C_i$ that are connected in series. In this model, the viscoelastic body is modeled (the generalized Maxwell model is generated) by connecting the dynamic springs 4-1, ..., 4-N in parallel to the static spring 1 modeling the elastic body. The number N of the dynamic springs is appropriately set in accordance with, for example, characteristics of a target viscoelastic body and a required accuracy of the model. The dynamic spring coefficient $\gamma_i$ and the damper viscosity coefficient $C_i$ ($i=1, \ldots, N$) are identified in the subsequent steps.

Step ST3

In step ST3, the spring coefficient and the damper viscosity coefficient of a material test piece (in the embodiment, the material test piece is different from the dumbbell test piece described above) are identified as a strain rate norm function based on the measurement results in the material test (dynamic characteristics measurement test) for the material test piece. At that time, a temperature-time conversion rule is used to identify the function above taking into account the temperature dependence.

The dynamic characteristic parameters to be obtained by the measurement are a dynamic spring coefficient $\gamma_i'$ and a damper viscosity coefficient $C_i'$ (i=1, . . . , N) in the generalized Maxwell model that models the material test piece. This model has the element configuration of springs and dampers similar to that in the generalized Maxwell model shown in FIG. 6. The dynamic spring coefficient $\gamma_i'$ and the damper viscosity coefficient $C_i'$ of the material test piece are generally expressed as a function of a norm of the strain rate vector $v\varepsilon$ as shown by Equations (10) and (11) below.

Equation 10

$$\gamma_i'(|v_\varepsilon|) \tag{10}$$

Equation 11

$$C_i'(|v_\varepsilon|) \tag{11}$$

Further, as the temperature-time conversion rule in step ST3, the Williams-Landel-Ferry (WLF) equation of Equation (12) below and a relaxation time of Equation (13) are used. Equation (12) is an equation for calculating a temperature-time converter $\alpha_r$. The relaxation time calculated using Equation (13) represents damping characteristics of the viscoelastic body. This makes it possible to improve an accuracy of predicting the characteristics (stress-strain characteristics) of the viscoelastic body when the environmental temperature changes. The temperature-time conversion rule using Equations above is known, and for example, the method disclosed in Japanese Unexamined Patent Application Publication No. 2019-159897 (JP 2019-159897 A) can be applied.

Equation 12

$$\log_{10}\alpha_T(T) = \frac{-C_1(T-T_R)}{C_2+(T-T_R)} \tag{12}$$

T: Test temperature
$T_R$: Reference temperature
$T_R = T_g + 50$
$T_g$: Glass transition temperature
$C_1$: Material constant
$C_2$: Material constant Equation 13

$$\tau = \frac{1}{A}|E'|^m \tag{13}$$

A: Multiplier
E': Strain rate
m: Power
G: Spring elasticity
γ: Rigidity ratio

In Equation (13) for calculating a relaxation time τ, it is possible to reproduce frequency dependence and amplitude dependence at the same time using a power function of a strain rate.

Step ST4

In step ST4, an average strain rate of the part shape bush is identified as a function of the displacement rate vector. Specifically, the relationship between a displacement rate vector v of the member (temporal change of the displacement vector u) and the strain rate vector $v\varepsilon$ at the displacement rate is obtained. Therefore, two assumptions that can be considered physically appropriate are made as shown below. That is, an assumption is made that although the strain of the material in the member is not strictly uniform, the strain is generally uniform except for a local area where the strain is particularly concentrated, and the strain rate vector $v\varepsilon$ has a distribution in which the norm of the strain rate vector $v\varepsilon$ has a uniform value (average strain rate) regardless of the position (Assumption 1). In addition, another assumption is made that the components of the strain rate vector (average strain rate vector) in which the norm is assumed to be uniformly distributed in the member can be approximated by a linear combination of the displacement rate vector v (Assumption 2). Under the assumptions above, the average strain rate vector can be expressed as shown in Equation (14) below using the matrix A having linear coupling coefficient components and the displacement rate vector v. Further, in this step, a value corresponding to each component of the matrix A is acquired by a method to be described later, and the average strain rate is identified as a function of the component of the displacement rate vector v.

Equation 14

$$\overline{v_\varepsilon} = Av \tag{14}$$

Step ST5

In step ST5, the dynamic spring coefficient $\gamma_i'$ and the damper viscosity coefficient $C_i'$ of the material test piece expressed as a function of the norm of the strain rate vector $v\varepsilon$ in step ST3 are converted to a function of the component of the displacement rate vector v in the member. This can be obtained by substituting the average strain rate of the equation (14) obtained in step ST4 as the norm of the strain rate vectors of Equations (10), (11). When the strain rate of the same norm occurs in the material test piece and the member, the dynamic spring coefficient and the damper viscosity coefficient are considered to be equal, and the dynamic spring coefficient $\gamma_i'$ and the damper viscosity coefficient $C_i'$ of the test piece that are expressed as the function of the component of the displacement rate vector v can be used as the dynamic spring coefficient $\gamma_i$ and the damper viscosity coefficient $C_i$ of the member. This can be summarized as in Equations (15), (16). As described above, the dynamic characteristic parameter of the member can be obtained based on the test results of the material test piece using the method shown in steps ST3 to ST5.

Equation 15

$$\gamma_i(v) \equiv \gamma_i'(|\overline{v_\varepsilon}|) = \gamma_i'(|Av|) \tag{15}$$

Equation 16

$$C_i(V) \equiv C_i'(|\overline{v_\varepsilon}|) = C_i'(|Av|) \tag{16}$$

Step ST6

In step ST6, the dynamic spring coefficient $\gamma_i$ and the damper viscosity coefficient $C_i$ obtained in step ST5 are applied to the generalized Maxwell model generated in step ST2 so as to complete the generalized Maxwell model (generalized Maxwell model for analysis in the disclosure).

As described above, the generalized Maxwell model generated in step ST2 is generated based on the static bush matrix model generated for each temperature condition (environmental temperature condition) in step ST1. Therefore, the generalized Maxwell model completed in step ST6 is generated as a simulation model that is capable of coping with changes in the temperature environment. Furthermore, this generalized Maxwell model can accurately reproduce the frequency dependence, the amplitude dependence, and the direction coupling.

Step ST7

In step ST7, various simulations are performed using the completed generalized Maxwell model so as to analyze the dynamic response of the bush. The analysis above can be executed by setting the generalized Maxwell model that is completed as a user-defined element of a general-purpose finite element analysis program, for example.

Specific Example of Processing in Step ST4

Hereinafter, a specific example of a method for obtaining the relationship between the average strain rate and the displacement rate vector of the bush will be described. In order to calculate the above matrix A, the behavior at the time of inputting the relative displacement to the bush may be calculated strictly using the finite element method, etc. However, sufficient accuracy can be ensured by performing an approximate calculation using a simplified method based on a physical consideration as described in each example below.

Figure 7:
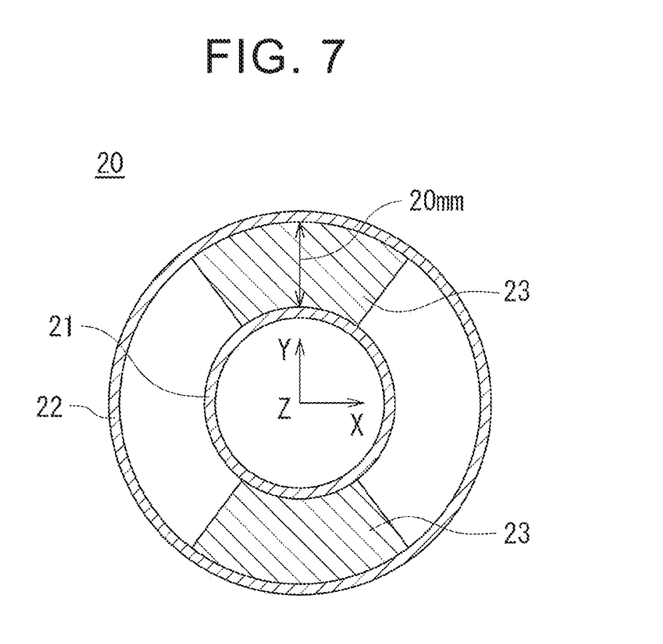
FIG. 7 is a diagram showing an example of a bush.

Example 1: In this example, strain is calculated based on the shape of the member. FIG. 7 shows an example of a sectional shape taken along a plane (XY plane) that is perpendicular to an axial direction (Z-axis direction) of a bush 20 that is a target of this example. As shown in FIG. 7, the bush 20 has an inner cylinder 21 and an outer cylinder 22 having the same central axis, and a rubber member 23 that is partially provided between the inner cylinder 21 and the outer cylinder 22. The rubber member 23 includes two portions that are arranged symmetrically with respect to the X axis. Each portion has a sectional shape that has a sector shape and is symmetrical with respect to the Y-axis. The sectional shape is uniform with respect to the Z-axis. A distance between end faces of the rubber member 23 on the inner cylinder 21 side and the outer cylinder 22 side is set to 20 mm, and a height (length in the Z-axis direction) of the rubber member 23 is set to 30 mm.

Figure 8:
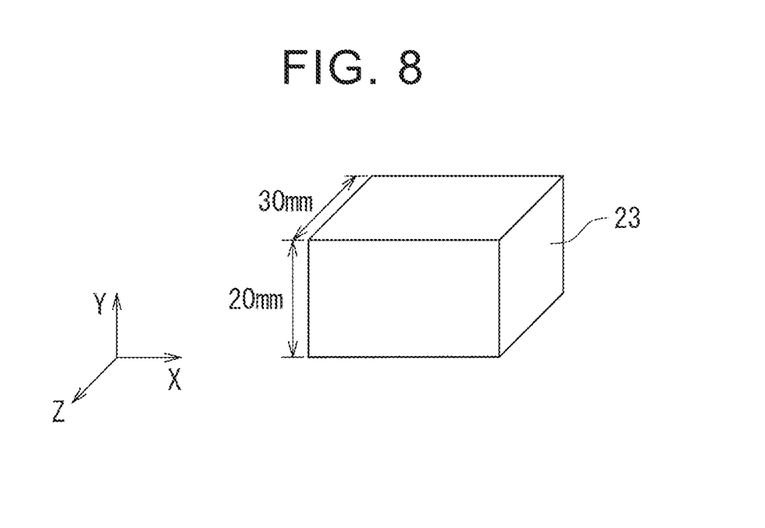
FIG. 8 is a diagram showing an example of an approximate shape of a bush member.
Figure 9A:
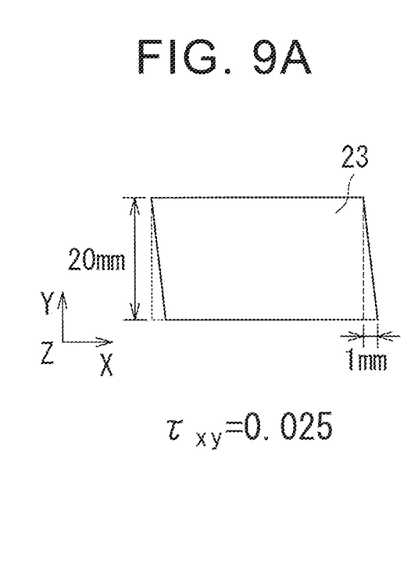
FIG. 9A is a diagram showing an example of a method of obtaining a strain rate with respect to a displacement rate based on the approximate shape of the bush member.
Figure 9B:
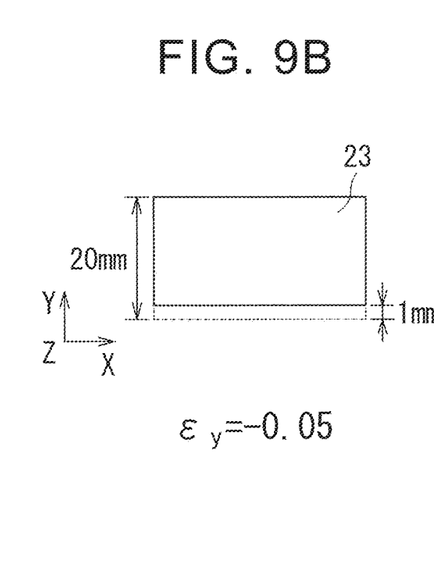
FIG. 9B is a diagram showing an example of a method of obtaining the strain rate with respect to the displacement rate based on the approximate shape of the bush member.
Figure 9C:
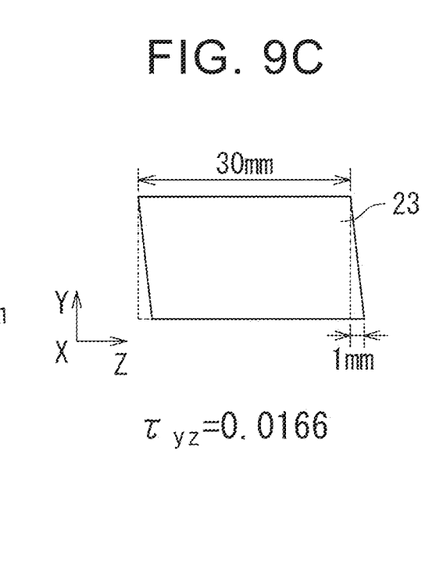
FIG. 9C is a diagram showing an example of a method of obtaining the strain rate with respect to the displacement rate based on the approximate shape of the bush member.

As shown in FIG. 8, each portion of the rubber member 23 is approximated to a rectangular parallelepiped having a surface with a shorter side being 20 mm and a longer side being 30 mm. When the strain of the rubber member 23 that is caused when the inner cylinder 21 is displaced by 1 mm in each of the X-axis, Y-axis, and Z-axis directions with respect to the outer cylinder 22 is obtained with the approximated rectangular parallelepiped as shown in each of FIGS. 9A, 9B, and 9C, shear strain $\tau_{xy}$=0.025, vertical strain $\varepsilon_y$=−0.05, and shear strain $\tau_{yz}$=0.0166 are obtained. This is regarded as a degree of contribution (coefficient) of the displacement rate component that is generated in the rubber member 23 in each axial direction to the strain rate component. Further, the coefficient is set to zero (0) in consideration that the rotation speed around each axis rarely produces a high strain rate. The matrix A is approximately obtained based on the above, and each component of the strain rate vector $v\varepsilon$ is expressed by a linear combination of each component of the displacement rate vector v, which results in Equation (17) below. The norm of the strain rate vector $v\varepsilon$ is specifically calculated based on Equation (17) such that the average strain rate can be expressed using a function of the component of the displacement rate vector as in Equation (18) below. It should be noted that, when Equation (18) is derived, the norm of the strain rate vector is not the magnitude of the vector but the matrix norm when the component is set as the component of a strain rate tensor.

Equation 17

$$\overline{v_\varepsilon} = \begin{pmatrix} \overline{\dot{\varepsilon}_x} \\ \overline{\dot{\varepsilon}_y} \\ \overline{\dot{\varepsilon}_z} \\ \overline{\dot{\tau}_{xy}} \\ \overline{\dot{\tau}_{yz}} \\ \overline{\dot{\tau}_{zx}} \end{pmatrix} = Av \cong \begin{pmatrix} 0 & 0 & 0 & 0 & 0 & 0 \\ 0 & 0.05 & 0 & 0 & 0 & 0 \\ 0 & 0 & 0 & 0 & 0 & 0 \\ 0.025 & 0 & 0 & 0 & 0 & 0 \\ 0 & 0 & 0.0166 & 0 & 0 & 0 \\ 0 & 0 & 0 & 0 & 0 & 0 \end{pmatrix} \begin{pmatrix} \dot{u}_x \\ \dot{u}_y \\ \dot{u}_z \\ \dot{u}_{rx} \\ \dot{u}_{ry} \\ \dot{u}_{rz} \end{pmatrix} \quad (17)$$

Equation 18

$$|\overline{v_\varepsilon}| = \sqrt{\overline{\dot{\varepsilon}_x}^2 + \overline{\dot{\varepsilon}_y}^2 + \overline{\dot{\varepsilon}_z}^2 + 2\overline{\dot{\tau}_{xy}}^2 + 2\overline{\dot{\tau}_{yz}}^2 + 2\overline{\dot{\tau}_{zx}}^2} \cong \sqrt{(0.05\dot{u}_y)^2 + 2(0.025\dot{u}_x)^2 + 2(0.0166\dot{u}_z)^2} \quad (18)$$

Example 2: In Example 2, unlike Example 1, calculation is performed based on the result of measuring the actual behavior of the bush. In Example 2, the degree of contribution to the strain rate component due to the rotational speed around each axis is approximated to 0 as in Example 1. Although the similar concept to that in Example 1 is applied, the contribution of the displacement rate component in each axial direction to the strain rate component is generalized as in Equation (19) below with a, b, and c being variables in place of specific values. The norm is calculated based on Equation (19) such that the average strain rate can be expressed using a function of the component of the displacement rate vector as in Equation (20) below. The values of a, b and c can be identified by performing a simple measurement with the actual bush such that the values of a, b, and c are adapted to the measurement results.

In the methods of the above two examples, the bush shown in FIG. 7 is an example, and the similar method can be applied to bushes of other shapes. Further, the material of the member may be a viscoelastic body other than rubber. The relationship between the average strain rate and the displacement rate vector of the bush may be obtained using other methods. For example, under a predetermined condition, the relationship between the average strain rate and the displacement rate vector can be obtained based on the components in the matrix H of the static bush matrix model obtained in step ST1.

Equation 19

$$\overline{v_\varepsilon} = \begin{pmatrix} \overline{\dot{\varepsilon}_x} \\ \overline{\dot{\varepsilon}_y} \\ \overline{\dot{\varepsilon}_z} \\ \overline{\dot{\tau}_{xy}} \\ \overline{\dot{\tau}_{yz}} \\ \overline{\dot{\tau}_{zx}} \end{pmatrix} = Av \cong \begin{pmatrix} 0 & 0 & 0 & 0 & 0 & 0 \\ 0 & b & 0 & 0 & 0 & 0 \\ 0 & 0 & 0 & 0 & 0 & 0 \\ a & 0 & 0 & 0 & 0 & 0 \\ 0 & 0 & c & 0 & 0 & 0 \\ 0 & 0 & 0 & 0 & 0 & 0 \end{pmatrix} \begin{pmatrix} \dot{u}_x \\ \dot{u}_y \\ \dot{u}_z \\ \dot{u}_{rx} \\ \dot{u}_{ry} \\ \dot{u}_{rz} \end{pmatrix} \quad (19)$$

Equation 20

$$|\overline{v_\varepsilon}| = \sqrt{\overline{\dot{\varepsilon}_x}^2 + \overline{\dot{\varepsilon}_y}^2 + \overline{\dot{\varepsilon}_z}^2 + 2\overline{\dot{\tau}_{xy}}^2 + 2\overline{\dot{\tau}_{yz}}^2 + 2\overline{\dot{\tau}_{zx}}^2} \cong \sqrt{2(a\dot{u}_x)^2 + 2(b\dot{u}_y)^2 + 2(c\dot{u}_z)^2} \quad (20)$$

The embodiment of the above processing is not limited. However, as one example, a computer including a processor may acquire data such as the measurement results for the material test piece and execute the processing.

Effects

As described above, in the embodiment, a model taken into account the dependence on the temperature environment is generated in consideration that the dynamic characteristics of the bush using a member of a viscoelastic body such as rubber change in accordance with the temperature environment. Therefore, the model corresponding to the environmental temperature can be generated as a model that reproduces the dynamic response of a part including the member made of a viscoelastic body. Consequently, highly accurate analysis of the dynamic response that reflects the characteristics that change in accordance with the temperature environment can be performed. Further, in the embodiment, a simulation model that is highly accurate and is fast in calculation can be constructed, including the static and dynamic characteristics (frequency dependence, amplitude dependence, pre-strain dependence, direction coupling) and the temperature dependence of the parts (vehicle suspension bush and engine mount).

Further, in step ST1, the simulation model of the analysis target is derived based on the relationship between the state quantity and the load of the analysis target obtained in both cases of vibrating the FEM model of the analysis target in a specific axial direction and of vibrating the FEM model in various other directions. With the FEM calculation results, the highly accurate simulation model with small degree of freedom can be constructed.

Further, the simulation model generated in the embodiment can be applied to the one-dimensional simulation in addition to the three-dimensional simulation. Further, the simulation model can be applied to the full-vehicle simulation and the real-time simulation for vehicles, and can provide a highly accurate simulation model as a simulation such as Software in the Loop Simulation (SILS), Model in the Loop Simulation (MILS), and Hardware in the Loop Simulation (HILS), which can contribute to achievement of fast and more accurate simulation.

Second Embodiment

Next, a second embodiment will be described. In the first embodiment described above, Assumption 1 and Assumption 2 above are defined with the entire member as one unit. However, depending on the shape of the member, there may be a case where reproducibility of the model is improved and calculation is made easier if the member is divided into two or more portions for consideration and assumption is made with each divided portion as one unit, rather than making the assumption for the entire member. This method will be described as a second embodiment.

Figure 10:
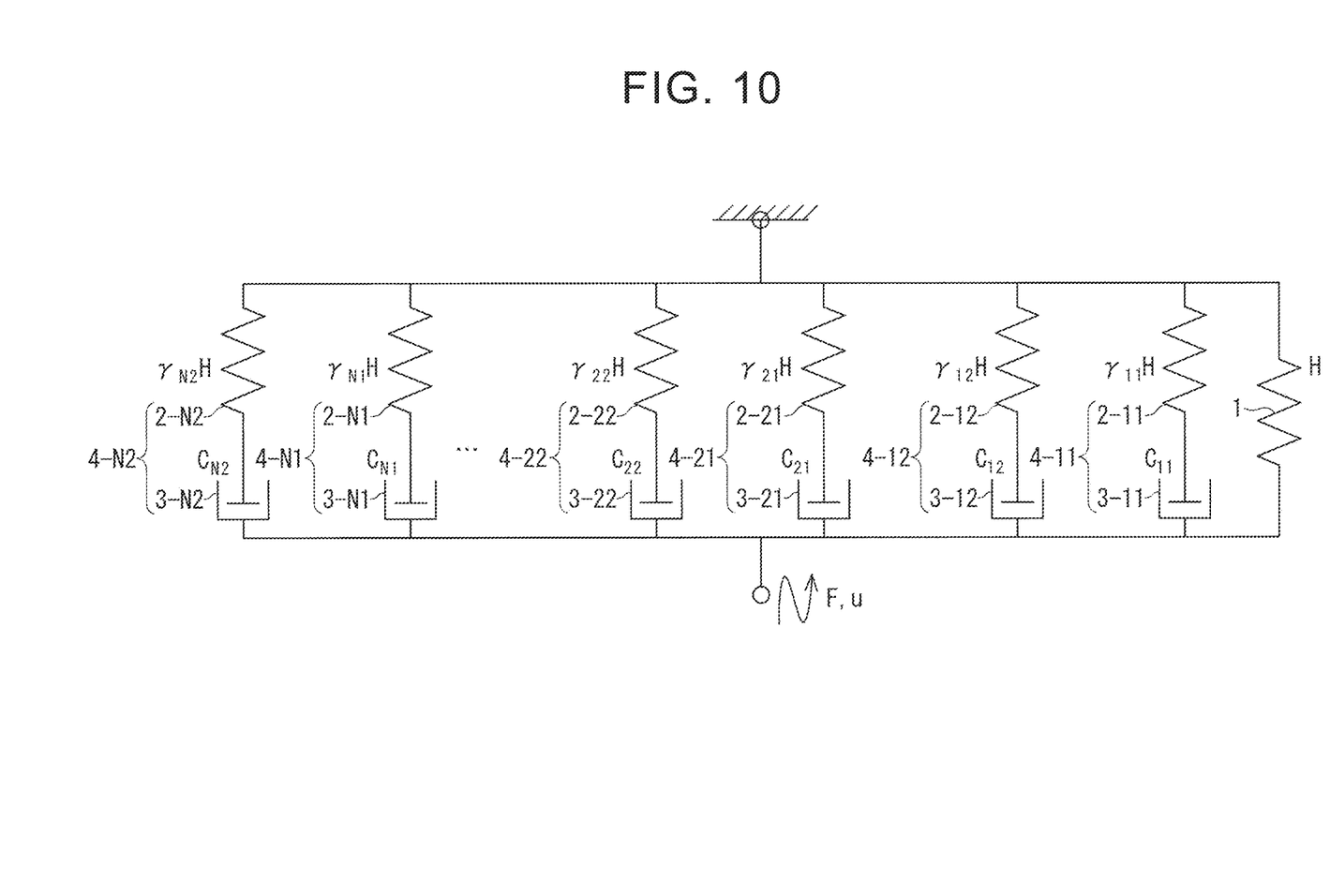
FIG. 10 is a diagram showing an example of the generalized Maxwell model.

In the second embodiment, the following two points are changed from the first embodiment. As a first change point, when performing modeling using the generalized Maxwell model in step ST2 of the first embodiment, N dynamic springs are provided for each divided portion of the member that is divided into two or more portions as shown in FIG. 10, instead of providing N dynamic springs that model the entire member. In the example shown in FIG. 10, the member is divided into two portions, a first portion and a second portion. A dynamic spring 4-$i$1 corresponding to the first portion and a dynamic spring 4-$i$2 corresponding to the second portion are provided (i=1, . . . , N), instead of the i-th dynamic spring 4-$i$ shown in FIG. 6. The dynamic spring 4-$i$1 includes a spring 2-$i$1 and a damper 3-$i$1 corresponding to the dynamic spring coefficient $\gamma_{i1}$ and the damper viscosity coefficient $C_{i1}$ of the first portion, respectively. The dynamic spring 4-$i$2 includes a spring 2-$i$2 and a damper 3-$i$2 corresponding to the dynamic spring coefficient $\gamma_{i2}$ and the damper viscosity coefficient $C_{i2}$ of the second portion, respectively. As a second change point, in step ST4 of the first embodiment, Assumption 1 and Assumption 2 are defined for each of the first and second portions instead of the entire member, and the relationship between the average strain rate and the displacement rate of the bush is obtained for each of the first and second portions. Further, the dynamic spring coefficients $\gamma_{i1}$, $\gamma_{i2}$ and the damper viscosity coefficients $C_{i1}$, $C_{i2}$ (i=1, . . . , N) are obtained for each of the first and second portions.

Specific Example of Processing in Step ST4

Figure 11:
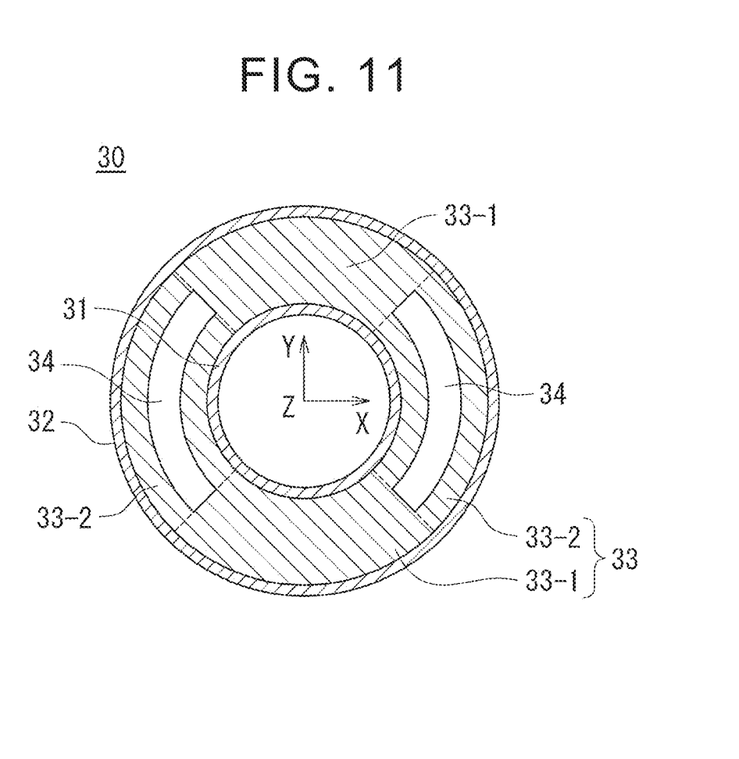
FIG. 11 is a diagram showing an example of a bush.
Figure 12:
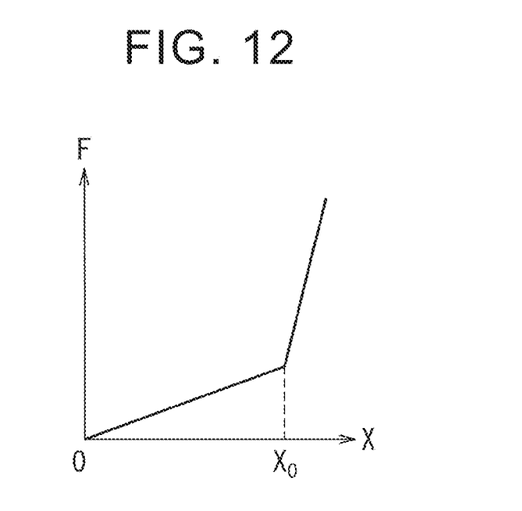
FIG. 12 is a diagram showing a relationship between displacement of a bush member and a load.
Figure 13A:
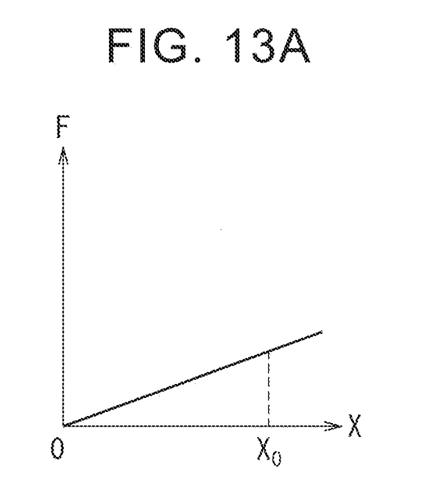
FIG. 13A is a diagram showing a relationship between displacement of a portion of the bush member and the load.
Figure 13B:
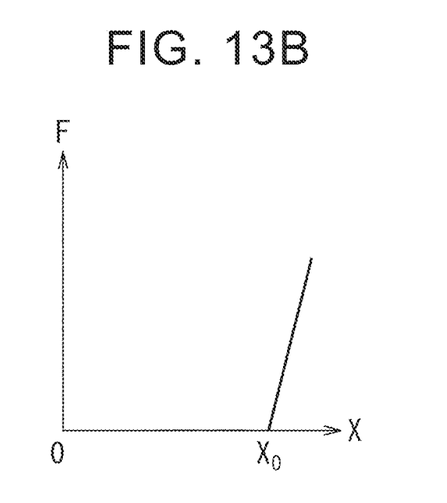
FIG. 13B is a diagram showing a relationship between displacement of other portion of the bush member and the load.

A specific example of processing in step ST4 according to the second embodiment will be described. FIG. 11 shows an example of a sectional shape taken along a plane (XY plane) that is perpendicular to an axial direction (Z-axis direction) of a bush 30 that is a target of this example. As shown in FIG. 11, the bush 30 has an inner cylinder 31 and an outer cylinder 32 having the same central axis, and a rubber member 33 that is provided between the inner cylinder 31 and the outer cylinder 32. The rubber member 33 is provided with two apertures 34 that are symmetrically with respect to the Y axis. FIG. 12 is a graph schematically showing the characteristics of the bush 30 with the horizontal axis representing the displacement in the X-axis direction and the vertical axis representing the load vector F in the X-axis direction. The inclination of the graph becomes larger after one of the apertures 34 is crushed at the displacement x0 and the inner walls facing each other come into contact with each other, compared to the inclination before the one aperture 34 is crushed. Here, consideration is made with dividing the rubber member 33 into two portions, first portions 33-1 that are ranges in which the apertures 34 are not provided and second portions 33-2 that are ranges in which the apertures 34 are provided, when viewed from the central axis. FIGS. 13A and 13B are graphs obtained by dividing the graph in FIG. 12 corresponding to contribution of the first portions 33-1 and contribution to the second portions 33-2. The graph in FIG. 13A includes a constant inclination regardless of the degree of crush of the apertures 34. In FIG. 13B, the inclination degree is 0 before the apertures 34 are crushed, and the inclination is generated after the apertures 34 are crushed. As described above, the characteristics of the first portions 33-1 and the second portions 33-2 are different from each other. Therefore, in this example, Assumption 1 and Assumption 2 are individually defined for each of the first and second portions to obtain the respective dynamic spring coefficients $\gamma_{i1}$, $\gamma_{i2}$ and the damper viscosity coefficients $C_{i1}$, $C_{i2}$, (i=1, . . . , N). Specifically, the methods of Examples 1 and 2 described above may be applied to each of the first and second portions. The dynamic spring coefficients $\gamma_{i1}$, $\gamma_{i2}$ and the damper viscosity coefficients $C_{i1}$, $C_{i2}$, are obtained by, for example, expressing the dynamic spring coefficients $\gamma i'$ and the damper viscosity coefficient $C_i'$ of the material test piece using a function of the component of the displacement rate vector v using the different matrices A1, A2, as shown in Equations (21) to (24) below. As described above, calculation of the dynamic parameter for each of the first and second portions having different characteristics makes it possible to facilitate calculation and improve accuracy for approximation. Note that, the graphs shown in FIGS. 12 and 13A, 13B omit the behavior of the viscoelastic body such as stress relaxation only for the purpose of making it easy to understand the description that the characteristics are different for each of the first and second portions.

Equation 21

$$\gamma_{i1}(v) \cong \gamma_i'(|A1v|) \qquad (21)$$

Equation 22

$$\gamma_{i2}(v) \cong \gamma_i'(|A2v|) \quad (22)$$

Equation 23

$$C_{i1}(v) \cong C_i'(|A1v|) \quad (23)$$

Equation 24

$$C_{i2}(v) \cong C_i'(|A2v|) \quad (23)$$

The dynamic spring coefficients $\gamma_{i1}$, $\gamma_{i2}$ and the damper viscosity coefficients $C_{i1}$, $C_{i2}$, thus obtained complete the generalized Maxwell model shown in FIG. 10. In the generalized Maxwell model, the dynamic spring is provided corresponding to each portion having different characteristics. Therefore, higher reproducibility can be obtained. Although the member is divided into two portions in the second embodiment, the member may be divided into three or more portions.

Also in the model generated according to the second embodiment, highly accurate analysis of the dynamic response that reflects the characteristics changing in accordance with the temperature environment can be performed, as in the case of the first embodiment above.

Other Embodiment

It should be noted that the disclosure is not limited to each of the embodiments above, and all modifications and applications included in the scope of claims and a range equivalent to the scope of claims are possible.

For example, in step ST1 of the embodiment above, the material parameter of each temperature condition obtained by the equation of the Yeoh model may be obtained in advance from the material test data and stored in the database, without using the equation. When it is not necessary to consider the direction coupling as the required model, the model obtained in step ST1 may not necessarily be the matrix model.

Further, in step ST2 of the embodiment above, the static spring 1 of the generalized Maxwell model is replaced with the matrix model. However, it is also possible to use the matrix model for other elastic portions. Further, the static spring 1 may be a proxy model of another degenerate method, such as proper orthogonal decomposition (POD) or proper generalized decomposition (PGD), instead of the matrix format.

The temperature-time conversion rule is used to consider the temperature dependence in step ST3 of the embodiment above. However, other rules may be applied. Further, various methods other than those described above may be applied as the identification method of the material coefficient. However, in $\gamma_1$ and $C_1$ representing the pseudo friction shown in the diagram of the generalized Maxwell model above, the exponent m on the right side of Equation (13) of the relaxation time ti is preferably "1".

Further, the displacement rate may be converted into the strain rate using a method other than steps ST3 to ST7 of the embodiment above.

The disclosure is useful for modeling dynamic responses of parts such as vehicle bushes, and can be used for, for example, designing high-quality parts.

What is claimed is:

1. A model generation method for generating a dynamic model that is a model for reproducing a dynamic response of a part including a member made of a viscoelastic body, the model generation method comprising:
    a step of generating a static model in the viscoelastic body for each of environmental temperature conditions;
    a step of generating a generalized Maxwell model for each of the environmental temperature conditions using the static model;
    a step of identifying a spring coefficient and a damper viscosity coefficient of the viscoelastic body as a function of a strain rate norm based on a measurement result of a material test piece using a temperature-time conversion rule;
    a step of identifying an average strain rate of the part as a function of a displacement rate vector;
    a step of identifying a dynamic spring coefficient and the damper viscosity coefficient of the part as a function of a component of the displacement rate vector; and
    a step of generating a generalized Maxwell model for analysis by applying the dynamic spring coefficient and the damper viscosity coefficient identified as the function of the component of the displacement rate vector to the generalized Maxwell model,
    wherein the generalized Maxwell model accurately reproduces characteristic changing in frequency dependence, amplitude dependence, and direction coupling in accordance with a change of environment temperature conditions.

2. The model generation method according to claim 1, wherein in the step of generating the static model, a relationship between a stress and a strain for each of the environmental temperature conditions is obtained, with a use of the material test piece made of the viscoelastic body, by inputting a load to the material test piece while changing the environmental temperature conditions so as to generate the static model using data of the relationship between the stress and the strain for each of the environmental temperature conditions.

3. The model generation method according to claim 1, wherein:
    the static model in the viscoelastic body that is generated for each of the environmental temperature conditions is a static matrix model; and
    in the step of generating the generalized Maxwell model, the generalized Maxwell model is generated for each of the environmental temperature conditions using a matrix of the static matrix model.

* * * * *